(12) United States Patent
Reinhardt et al.

(10) Patent No.: US 6,520,506 B2
(45) Date of Patent: Feb. 18, 2003

(54) RADIAL SHAFT SEAL

(75) Inventors: Hans Reinhardt, Weinheim (DE); Rolf Stadler, Heppenheim (DE); Rolf Vogt, Oftersheim (DE)

(73) Assignee: Firma Carl Freudenberg, Weinheim (DE)

( * ) Notice: Subject to any disclaimer, the term of this patent is extended or adjusted under 35 U.S.C. 154(b) by 0 days.

(21) Appl. No.: 09/838,837

(22) Filed: Apr. 20, 2001

(65) Prior Publication Data

US 2002/0074734 A1 Jun. 20, 2002

(30) Foreign Application Priority Data

Apr. 22, 2000 (DE) .......................... 100 19 994

(51) Int. Cl.⁷ ............................... F16J 15/32
(52) U.S. Cl. .................. 277/549; 277/551; 277/560
(58) Field of Search ................. 277/500, 549, 277/551, 560, 402

(56) References Cited

U.S. PATENT DOCUMENTS 4,410,190 A * 10/1983 Potter .................... 277/559
5,967,527 A * 10/1999 Fabro et al. ............ 277/560
6,056,292 A * 5/2000 Gerigk .................. 277/549
6,173,961 B1 * 1/2001 Martin ................... 277/353

FOREIGN PATENT DOCUMENTS

| DE | 2 333 208 | 1/1974 |
| DE | 2 352 992 | 5/1974 |
| DE | 37 42 080 | 6/1989 |
| DE | 195 18 577 | 11/1996 |
| JP | 07301339 | 11/1995 |
| JP | 08303604 | 11/1996 |

* cited by examiner

Primary Examiner—Anthony Knight
Assistant Examiner—Enoch E Peavey
(74) Attorney, Agent, or Firm—Kenyon & Kenyon

(57) ABSTRACT

A radial shaft seal, which includes a ring-shaped, metal supporting body and a sealing lip disposed thereon, in order to separate a hydraulic side that is particularly under high pressure, from an atmospheric side, the sealing lip being pressed onto the shaft by an annular helical spring. In an uninstalled sealing ring, the working plane of the annular helical spring has a value x that is less than zero with respect to the working plane of the sealing edge, and in an installed sealing ring, the two working planes are approximately coplanar.

30 Claims, 3 Drawing Sheets

RADIAL SHAFT SEAL

FIELD OF THE INVENTION

The present invention relates to a seal for rotating shafts, which includes a preformed ring made of rubber or similar plastomers, and is inserted in ring slots in order to seal shafts or similar machine parts. The oil present in the machine is held back, and no dirt or dust from outside enters into the machine. Such seals are especially used in motor vehicles.

BACKGROUND INFORMATION

Such a seal is described in German Published Patent Application No. 2 333 208. The working planes of the lip-seal sealing edge and the working plane of the annular helical spring are staggered and so that the working plane of the annular helical spring is shifted toward the atmospheric side of the seal. The result is a value X, which is also referred to as value R, and is positive. This is regarded as being necessary for achieving a good seal and preventing losses of operating oil. To improve the effectiveness of the seal, the air side of the lip seal is provided with a concave, preformed surface. This forms a sharply delimited angle between the sealing edge and the shaft surface. This angle is relatively large, and is between 50 and 80 degrees. The opposite angle directed towards the hydraulics is selected to be considerably smaller, such as less than 10 degrees, or even 5 degrees, but not greater than 20 degrees. However, such a seal does not fulfill the set requirements in many cases. At higher hydraulic pressures, and also at higher shaft speeds, there is a danger of these seals running dry and being subject to a high degree of wear.

German Published Patent Application No. 37 42 080 describes another type of seal, in which the object is to sufficiently lubricate the sealing strip, and therefore, to increase the service life. The seal is used for low-viscosity media, e.g., water, the pressure of the water being higher than the pressure of the gaseous medium on the other side of the seal. In order to direct the water under and through the sealing lip, the angles between the sealing-lip surfaces and the shaft are selected to be very small. The lower the viscosity of the liquid, the smaller the angle selected. In this case, the angle should be at most 12 degrees. In addition, hydrodynamic conveying grooves are disposed on the lip, which are designed to convey the liquid medium from the higher-pressure to the lower-pressure medium. The working plane of the annular helical spring has a negative value with respect to the working plane of the sealing edge. This is necessary for the pumping action of the seal. However, it leads to considerable amounts of water being directed through the seal. Such a measure is acceptable as long as the liquid medium is water, e.g., as in drive shafts of ships. However, this is not acceptable for drive motors.

SUMMARY

Therefore, it is an object of the present invention to provide a radial shaft seal, in which the sealing lip does not experience wear, leakage is prevented to a great extent, and the sealing lip is effectively lubricated.

The seal may be used in areas where the hydraulic pressure is considerably higher than atmospheric pressure. The seal may be able to withstand hydraulic pressures of over 5 bar and up to 10 bar, depending on the rotational speed. The seal may also be usable at all viscosities.

In the case of a radial shaft seal, which is made of a ring-shaped, metal supporting body and a sealing lip disposed on it, to separate a hydraulic side that is particularly under high pressure, from an atmospheric side, in which case the sealing lip is pressed onto the shaft by an annular helical spring, the object of the present invention is achieved in that, in an uninstalled sealing ring, the working plane of the annular helical. spring has a value X that is less than zero with respect to the working plane of the sealing edge, and in the case of an installed sealing ring, the two working planes are approximately coplanar.

During the manufacture of the sealing ring, care should be taken that the value X is between 0 and 2 mm, preferably between 0 and 0.8 mm, so that it always has a negative value. This value X may be approximately 1% of the sealing-ring inner diameter. By installing the sealing ring, i.e., fitting it onto the shaft, the two mentioned planes are moved toward one another, and come to rest approximately one over another. It has been shown that this manner of installing the sealing ring minimizes leakage. Thus, the lubrication is effective, and wear is prevented at the sealing lip.

The angles between the sealing-lip surfaces and the shaft are formed so that angle alpha between the sealing-lip surface facing the atmospheric side and the longitudinal section of the shaft is greater than angle beta between the sealing-lip surface facing the hydraulic side and the longitudinal section of the shaft. It was determined that this angle configuration minimizes the effective sealing area between the lip and the shaft. Angle beta is selected to be 15 to 30 degrees, preferably 17 to 22 degrees, and angle alpha is selected to be 35 to 65 degrees, preferably 45 to 60 degrees.

Starting from the sealing lip, a grease chamber may be positioned in the direction of the atmospheric side. This grease chamber may be terminated by an additional sealing lip, which is integrally connected to the sealing lip. The sealing-lip surface directed toward the atmospheric side may be subdivided into two sections, the first section forming angle alpha with the shaft, and the second section having angle (gamma), which is approximately half as large as angle beta.

Angles alpha and beta are approximately equal in an installed sealing ring. They then assume values between 20 and 50 degrees, and are preferably 30 degrees.

The sealing function of a sealing ring designed in this manner may be further improved by so-called dynamic sealing aids (swirl or helical patterns) which, for example, may be arranged as raised patterns or structures on the sealing-lip surface, in the direction of the atmospheric side.

DETAILED DESCRIPTION

Figure 1:
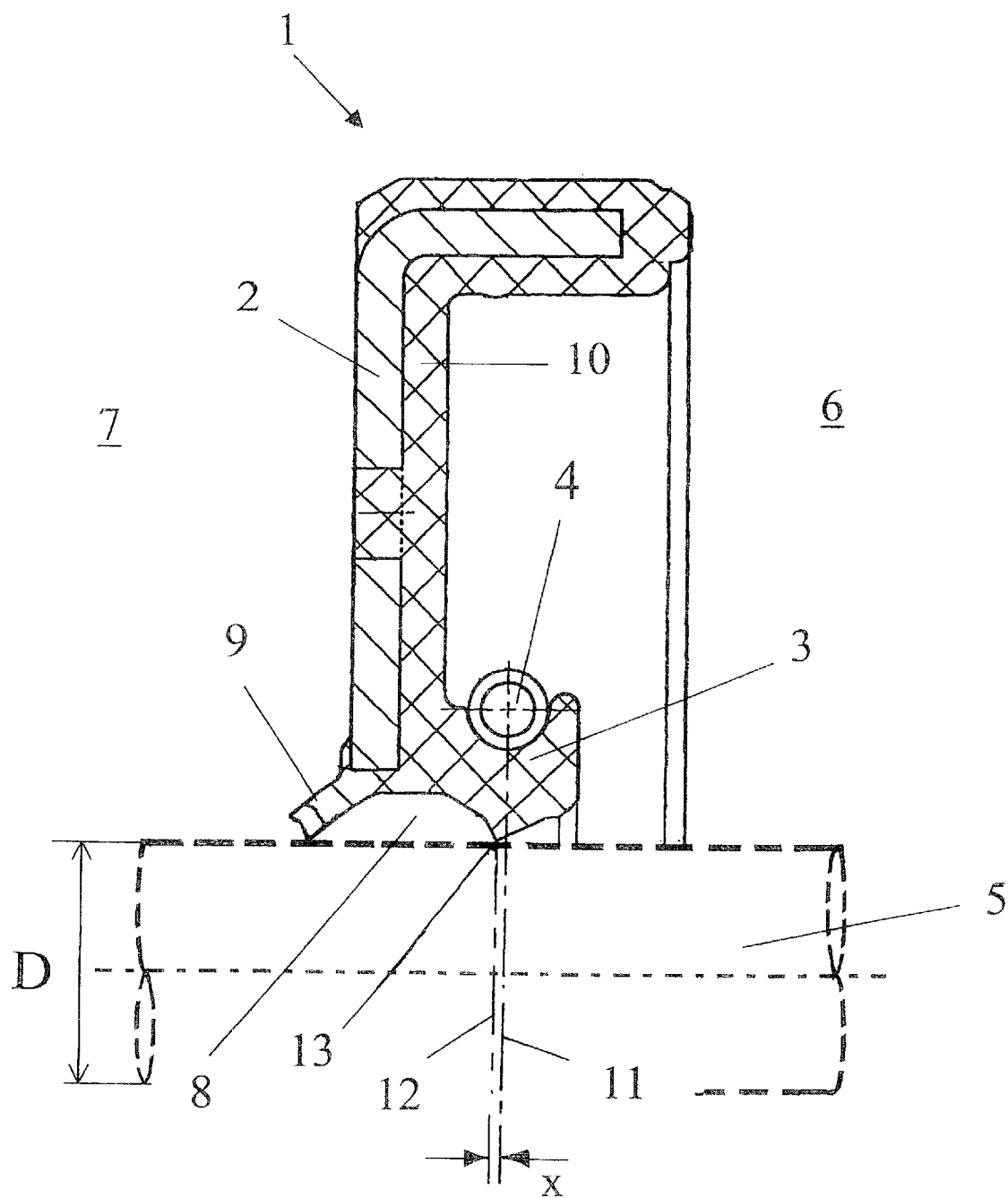
FIG. 1 is a longitudinal cross-sectional view of the upper part of the sealing ring.

FIG. 1 shows a longitudinal cross-section of the upper part of a radial shaft seal 1. Radial shaft seal 1 is made of metal, ring-shaped supporting body 2 having sealing lip 3 attached to it by vulcanization. Sealing lip 3 is pressed onto shaft 5 by annular helical spring 4. The hydraulic side of the seal is denoted by reference numeral 6 and, from the point of view of one looking at the drawing, is located to the right of the sealing ring. Therefore, atmospheric side 7 is situated on the left side of the drawing. In the direction of atmospheric side 7, the sealing ring has grease chamber 8, which is terminated by an additional sealing lip 9 that rests on shaft 5. Sealing lips 3 and 9 are integrally connected to each other and gradually change into cover 10, which is connected to supporting body 2.

FIG. 1 shows sealing ring 1 in the uninstalled state. For this reason, shaft 5 is also only indicated by a dashed line. Working plane 11 of annular helical spring 4 is shifted toward hydraulic side 6, in relation to working plane 12 of sealing-lip 3 sealing edge 13, so that value X, which defines the distance between the two working planes 11 and 12, is less than 0. Value X is selected to be approximately 1% of sealing-ring inner diameter D. This sealing-ring diameter D is slightly smaller than the shaft diameter.

Figure 2:
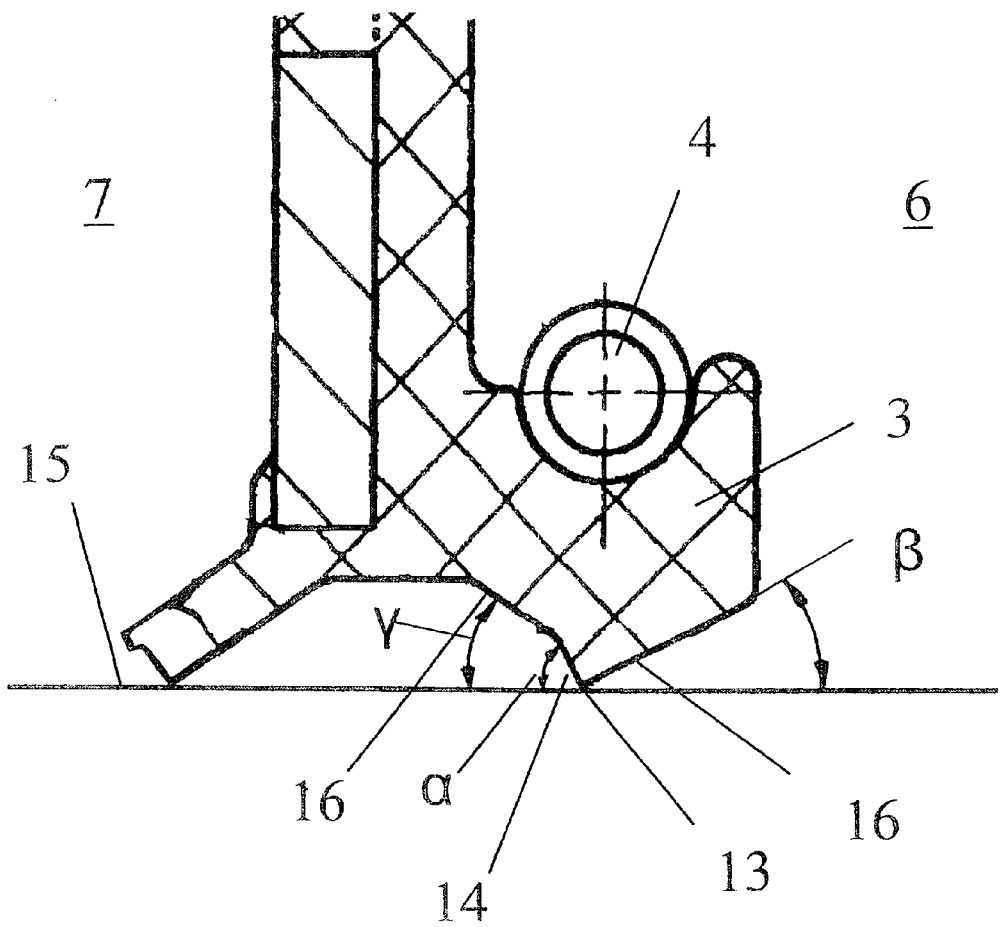
FIG. 2 is an enlarged cross-sectional view of the sealing-lip shape.

In order to more effectively display the angle at sealing lip 3, an enlarged view of the relevant section of sealing ring 1 is illustrated in FIG. 2. Sealing-lip surface 14, which extends in the direction of atmospheric side 7, is positioned at an angle alpha to plane 15. Angle beta indicates the inclination of sealing-lip surface 16 that faces hydraulic side 6. In the example embodiment of the present invention, angle alpha is 60 degrees, while angle beta is 20 degrees. In an inserted sealing ring 1, this angle combination, in connection with the configuration of working planes 11 and 12 of annular helical spring 4 and sealing edge 13, provides the desired result. Sealing-lip surface 14 directed toward atmospheric side 7 is supplemented by an additional section 16, which is at an angle gamma to plane 15. This angle gamma is selected to be smaller than angle beta on the other side of sealing lip 3.

Figure 3:
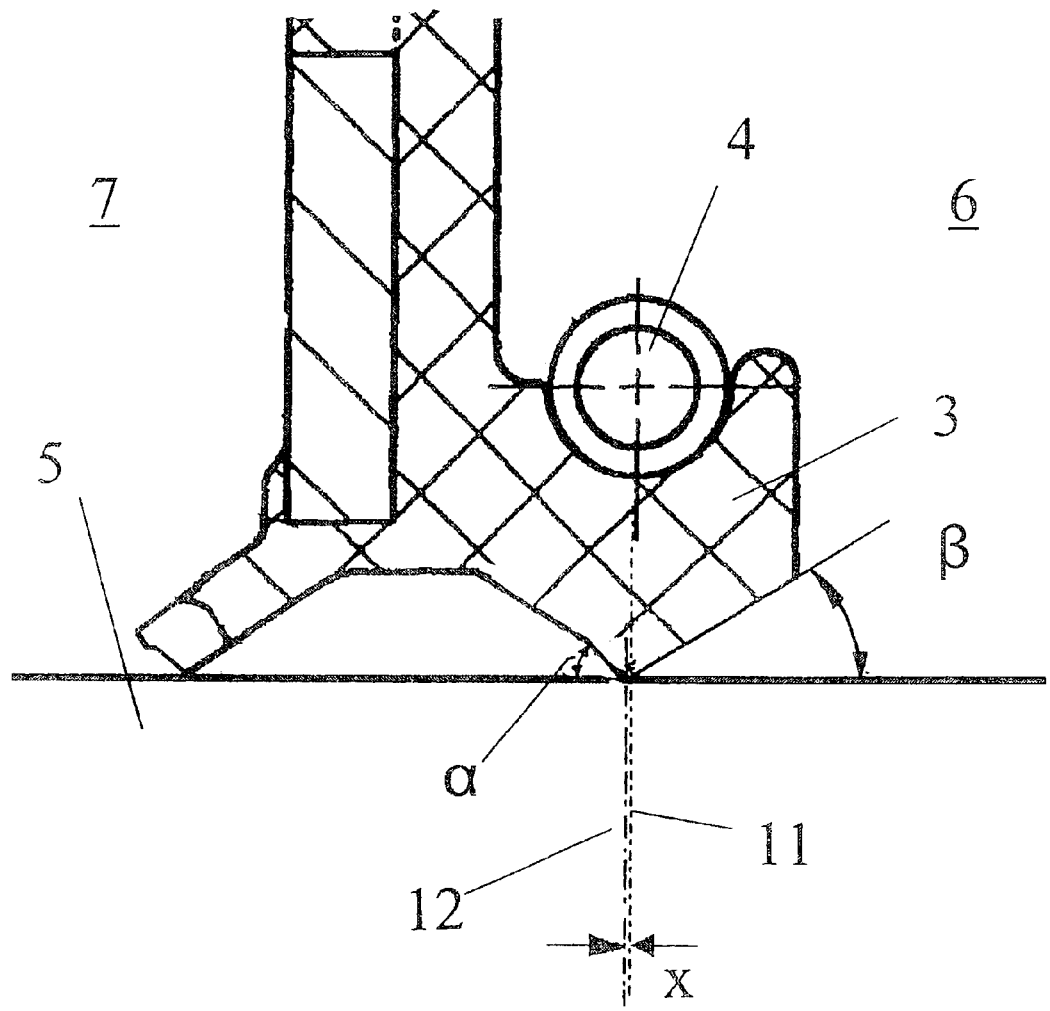
FIG. 3 is an enlarged cross-sectional view of the sealing-lip shape in an installed sealing ring.

FIG. 3 is an enlarged cross-sectional view of sealing ring 1, after it is fitted onto shaft 5. Angles alpha and beta have changed, and are approximately 30 degrees each. Working planes 11 and 12 of annular helical spring 4 and sealing edge 13 substantially coincide. In an installed sealing ring 1, the combination of angles alpha and beta, as well as the configuration of working planes 11 and 12 with respect to each other, render the seal untight, i.e., prevent a seal, so that there is desired leakage under the sealing edge.

What is claimed is:

1. A radial shaft seal, comprising:
    a ring-shaped metal supporting body;
    a first sealing lip disposed on the ring-shaped metal supporting body;
    a second sealing lip integrally connected to the first sealing lip the second sealing lip terminating a grease chamber;
    an annular helical spring configured to press the first sealing lip onto a shaft to separate a hydraulic side under high pressure from an atmospheric side;
    wherein, when uninstalled, a working plane of the annular helical spring is disposed at a distance X from the atmospheric side greater than a working plane of the first sealing lip; and
    wherein, when installed, the working plane of the annular helical spring is substantially coplanar with the working plane of the first sealing lip.

2. The radial shaft seal according to claim 1, wherein, the distance X has a value between 0 and 2 mm.

3. The radial shaft seal according to claim 2, wherein an angle alpha between a first sealing lip surface disposed toward the atmospheric side and a longitudinal section of a plane of the shaft is greater than an angle beta between a second sealing lip surface disposed toward the hydraulic side and the longitudinal section of the plane of the shaft.

4. The radial shaft seal according to claim 3, wherein the angle beta is between 15 and 30 degrees.

5. The radial shaft seal according to claim 3, wherein the angle beta is between 17 and 22 degrees.

6. The radial shaft seal according to claim 3, wherein the angle alpha is between 35 and 65 degrees.

7. The radial shaft seal according to claim 3, wherein the angle alpha is between 40 and 60 degrees.

8. The radial shaft seal according to claim 3, wherein the sealing lip includes a first section facing the atmospheric side that forms the angle alpha with the plane of the shaft and a second section contiguous with the first section, the second section forming an angle gamma with the plane of the shaft, the angle gamma being approximately one half of the angle beta.

9. The radial shaft seal according to claim 3, wherein, when installed, the angle alpha is approximately equal to the angle beta.

10. The radial shaft seal according to claim 9, wherein, when installed, the angle alpha and the angle beta are between 20 and 50 degrees.

11. The radial shaft seal according to claim 9, wherein, when installed, the angle alpha and the angle beta are approximately 30 degrees.

12. The radial shaft seal according to claim 2, wherein the first sealing lip further defines the grease chamber and is disposed on the atmospheric side.

13. The radial shaft seal according to claim 1, wherein the distance X has a value between 0 and 0.8 mm.

14. The radial shaft seal according to claim 3, wherein the value of X is approximately 1% of an inner diameter D of the first sealing lip.

15. A radial shaft seal, comprising:
    a ring-shaped metal supporting body;
    a first sealing lip disposed on the ring-shaped metal supporting body;
    an annular helical spring configured to press the first sealing lip onto a shaft to separate a hydraulic side under high pressure from an atmospheric side;
    when uninstalled, a working plane of the annular helical spring is disposed at a distance X from the atmospheric side greater than a working plane of the first sealing lip, the distant X having a value between 0 and 2 mm; and
    when installed, the working plane of the annular helical spring is substantially coplanar with the working plane of the first sealing lip;
    an angle alpha between a first sealing lip surface disposed toward the atmospheric side and a longitudinal section of a plane of the shaft is greater than an angle beta between a second sealing lip surface disposed toward the hydraulic side and the longitudinal section of the plane of the shaft;
    wherein the sealing lip further including a first section facing the atmospheric side that forms the angle alpha with the plane of the shaft and a second section contiguous with the first section, the second section forming an angle gamma with the plane of the shaft, the angle gamma being approximately one half of the angle beta.

16. The radial shaft seal according to claim 15, wherein the value of X is approximately 1% of an inner diameter D of the first sealing lip.

17. The radial shaft seal according to claim 15, wherein the angle beta is between 15 and 30 degrees.

18. The radial shaft seal according to claim 15, wherein the angle beta is between 17 and 22 degrees.

19. The radial shaft seal according to claim 15, wherein the angle alpha is between 35 and 65 degrees.

20. The radial shaft seal according to claim 15, wherein the angle alpha is between 40 and 60 degrees.

21. The radial shaft seal according to claims 15, wherein the first sealing lip defines a grease chamber disposed on the atmospheric side.

22. The radial shaft seal according to claim 15, wherein, when installed, the angle alpha is approximately equal to the angle beta.

23. The radial shaft seal according to claim 15, wherein, when installed, the angle alpha and the angle beta are between 20 and 50 degrees.

24. The radial shaft seal according to claim 15, wherein, when installed, the angle alpha and the angle beta are approximately 30 degrees.

25. A radial shaft seal for use with a metal shaft comprising:

a ring-shaped metal supporting body having a sealing lip thereon and defining a hydraulic side and an atmospheric side with respect to the metal shaft, the sealing lip having a first working plane, the sealing lip defining an angle with the metal shaft on the atmospheric side and an angle $\beta$ on the hydraulic side;

an annular spring for pressing the radial shaft seal against the metal shaft, the annular spring having a second working plane;

in an uninstalled state, the second working plane is interposed between the first working plane and the hydraulic side and in an installed state the first working plane and the second working planes are substantially coplanar; and wherein the angle is greater than the angle $\beta$.

26. The radial shaft seal of claim 25, wherein the angle $\beta$ is between 15 and 30 degrees.

27. The radial shaft seal of claim 25, wherein the angle $\beta$ is between 17 and 22 degrees.

28. The radial shaft seal of claim 25, wherein the angle is between 40 and 60 degrees.

29. The radial shaft seal of claim 25, wherein the sealing lip defines a grease chamber disposed on the atmospheric side.

30. The radial shaft seal of claim 25 further comprising a second sealing lip integrally connected to the first sealing lip, the second sealing lip terminating grease chamber.

* * * * *